Sept. 19, 1967  M. NADDELL  3,342,475
HYDROPNEUMATIC SUSPENSION DEVICE
Filed Oct. 4, 1965  2 Sheets-Sheet 1

INVENTOR.
Manuel Naddell
BY
C. J. Biskup
ATTORNEY

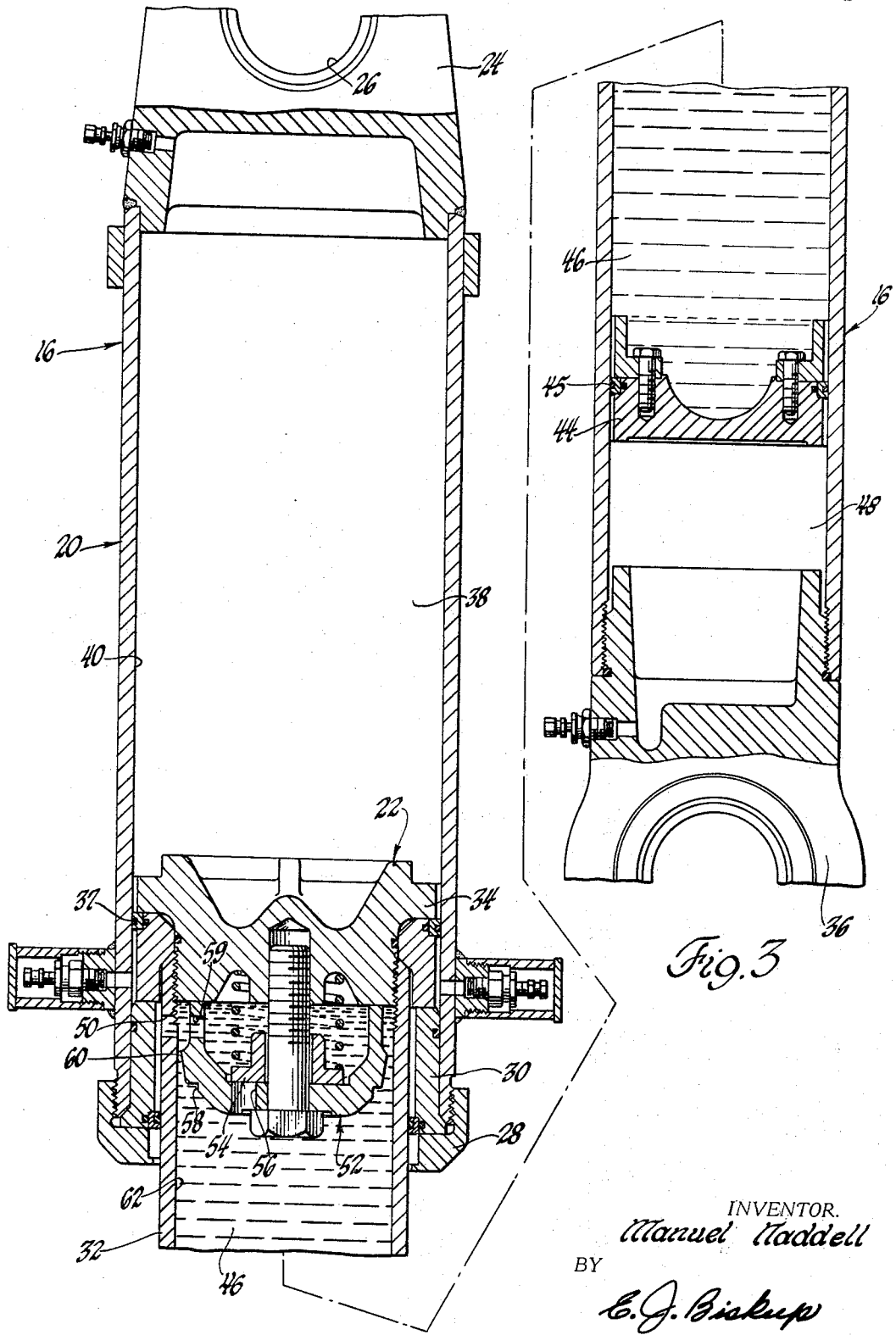

United States Patent Office 3,342,475
Patented Sept. 19, 1967

3,342,475
HYDROPNEUMATIC SUSPENSION DEVICE
Manuel Naddell, Los Angeles, Calif., assignor to General Motors Corporation, Detroit, Mich., a corporation of Delaware
Filed Oct. 4, 1965, Ser. No. 492,809
5 Claims. (Cl. 267—64)

This invention concerns a vehicle suspension and more particularly a hydropneumatic suspension device having combined spring and shock absorber units.

An object of the present invention is to provide an improved suspension device.

Another object of the present invention is to provide a suspension device having opposed chambers filled with a gas so that a gas spring is provided during jounce and rebound.

A further object of the present invention is to provide a hydropneumatic suspension device having a shock absorber incorporated therewith for varying the rate of movement of the device during jounce and rebound.

The above objects and others are accomplished in accordance with the invention by providing a hydropneumatic suspension device which supports a vehicle chassis on a wheeled axle and comprises a cylinder member having a relatively movable primary piston member mounted therein. Means are provided for pivotally connecting one of the members to the vehicle chassis and the other of the members to the axle. The primary piston member has a hollow rod terminating at its outer end with a mounting eye, while the inner end of the primary piston member is formed with a head portion which circumferentially and sealingly engages the inner wall of the cylinder member. A cap closes the head portion end of the cylinder member and a collar is secured to the opposite end of the cylinder member. A secondary piston member is slidably located in the rod portion and a first chamber filled with a compressible gas is located between the cap and one side of the head portion while a second chamber filled with an incompressible fluid is located on the other side of the head portion, the inner wall of the cylinder member and the outer wall of the rod portion. A third chamber is located in the rod and defined by one side of the secondary piston and the other side of the head portion. Passage means are formed in the rod portion for permitting incompressible fluid to move between the second and third chambers during expansion and contraction of the suspension device. Finally, a fourth chamber is located in the rod on the other side of the secondary piston and filled with a compressible gas. A check valve assembly is attached to one side of the head portion and includes a cup-shaped member having an annular ring adjacent to the inner wall of the rod portion and located to one side of the passage so as to restrict fluid flow between the second and third chambers when the suspension device is expanded. A spring biased valve closes suitable apertures formed in the cup-shaped member and is adapted to open to provide an increased rate of fluid flow between the second and third chambers in the fourth chamber when the suspension device is contracted.

Other objects, features, and advantages of the present invention will be more apparent from the following detail description when taken in conjunction with the drawings in which:

FIGURE 3 is a view similar to FIGURE 2 further enlarged and shows the hydropneumatic device in the fully expanded position.

Figure 1:
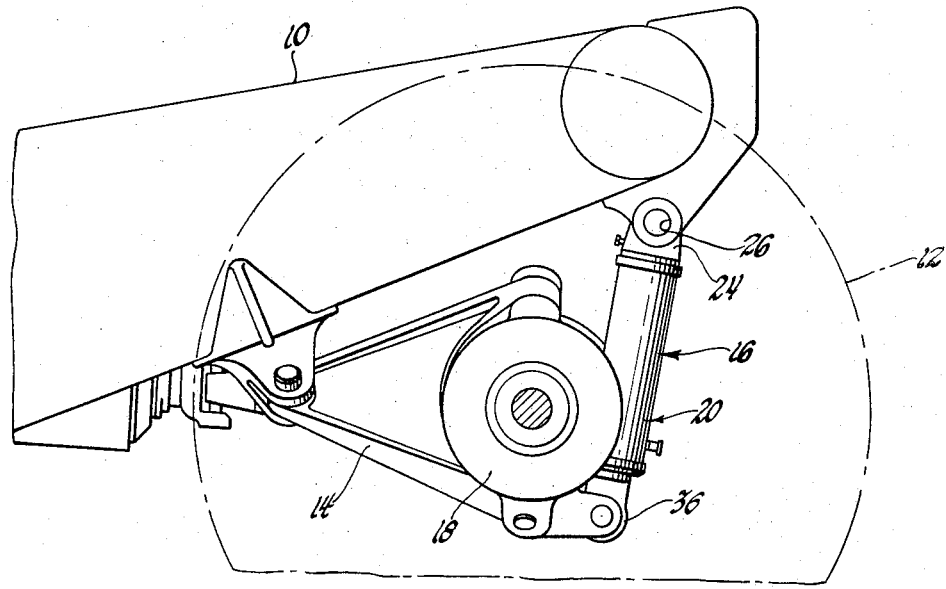
FIGURE 1 is a partial view of a rear suspension arrangement incorporating a hydropneumatic suspension device made in accordance with the invention.

Referring now to the drawings and more specifically to FIGURE 1 thereof, one side of the rear end portion of an off-highway vehicle is shown comprising a chassis 10 suitably supported by ground engaging wheels 12 which are drivingly connected to the vehicle through a suspension arrangement that includes a control arm 14, a hydropneumatic spring device 16, and a rear axle housing 18. At this juncture, it will be noted that although the hydropneumatic suspension device 16 made in accordance with the invention is shown incorporated with one form of suspension system, it can be adapted for other types and can also be utilized for supporting the front axle of a vehicle.

Figure 2:
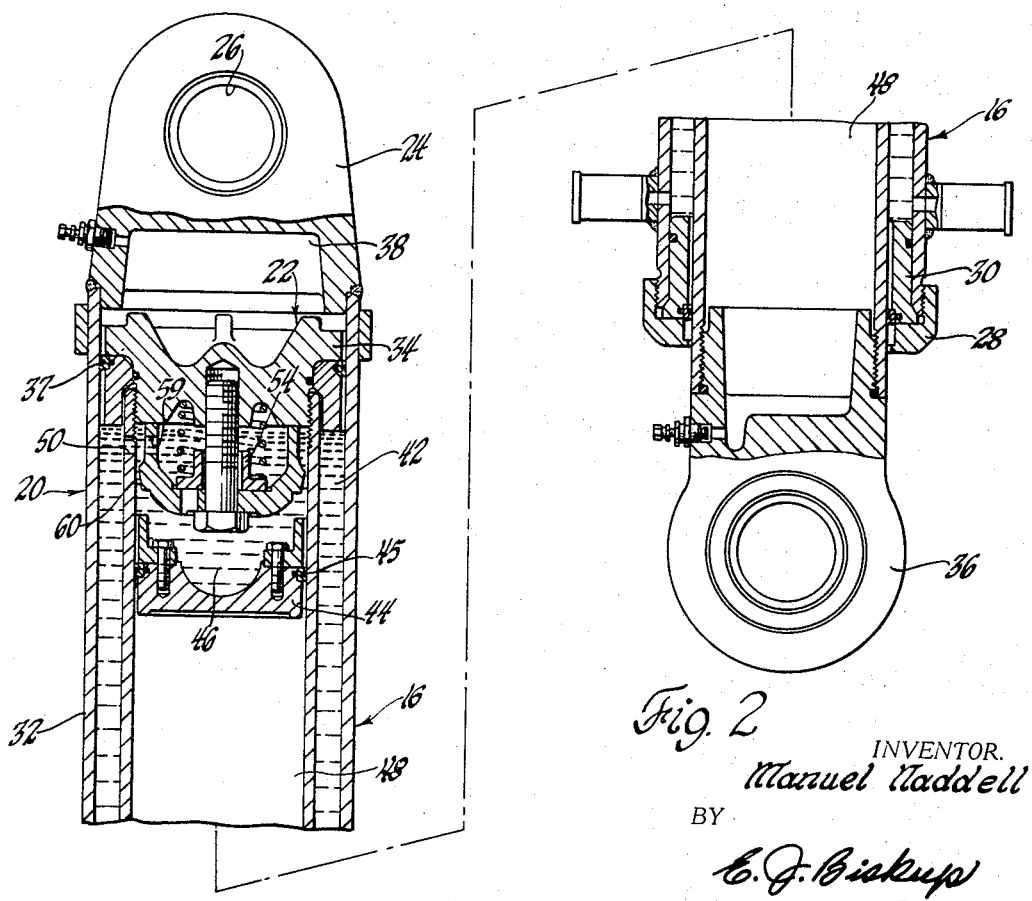
FIGURE 2 is an enlarged sectional view showing the details of the hydropneumatic suspension device and the position assumed by the various parts thereof when the device is in the fully contracted position.

Referring now to FIGURES 2 and 3, the hydropneumatic suspension device 16 is shown comprising a cylinder member 20 having a piston member 22 reciprocably supported therein. The cylinder member 20 has the upper end thereof closed by a cap member 24 which includes a mounting eye 26 that serves to pivotally connect this end of the cylinder to the chassis 10 of the vehicle as seen in FIGURE 1. The lower end of the cylinder member 20 has a collar 28 threadably secured thereto for retaining a sealing ring 30, a portion of which circumferentially and sealingly engages the outer diameter of the hollow rod 32 of the piston member 22.

The piston member 22 has a head portion 34 fixed to the inner end of the rod 32, while the outer end is closed by a mounting eye member 36 which can be pivotally connected to the axle housing 18 as seen in FIGURE 1. The head portion 34 includes a sealing ring 37 which circumferentially engages the inner wall 40 of the cylinder member. Thus, the head portion 34 of the piston member 22 and the cap member 24 of the cylinder member 20 cooperate to form a closed spring chamber 38 which in this case is pressurized with a compressible gas such as dry nitrogen. Similarly, the rod 32 of the piston member together with the inner wall 40 of the cylinder member 20 define an annular chamber 42 which is filled with an incompressible fluid such as oil as seen in FIGURE 2.

A free piston member 44 is slidably located within the rod 32 and includes a ring type seal 45 that serves to divide the rod interior into an oil filled chamber 46 and a gas filled accumulator chamber 48. The chamber 46 communicates with the chamber 42 through a passage 50 and a valve assembly 52 which includes a spring biased valve 54 that serves to open and close one or more passages 56 located in the lower end of a cup-shaped member 58 which is bolted to the underside of the head portion 34. The cup-shaped member 58 is formed with a radial passage 59 and includes an annular rim portion 60 which is slightly spaced from the inner wall 62 of the rod 32 so as to provide an annular orifice which restricts fluid communication between the area located above the rim and the lower side of the valve assembly.

From the above description it should be apparent that this hydropneumatic suspension device has four chambers, two of which are filled with an incompressible fluid such as oil, while the other two are filled with a compressible gas such as nitrogen. As seen in FIGURE 2, the suspension device is shown in the fully compressed position, at which time, the gas located in the spring chamber 38 is fully compressed, while that located in the accumulator chamber 48 has expanded and caused the free piston member 44 to be raised to its uppermost position. Thus, during compression, the oil flows from the chamber 46 to the chamber 42 under the influence of the gas in the accumulator chamber 48. During this time, the valve 54 moves from its seated positon to open the passage 56 so that oil flows through the passages 59 and 50 into chamber 42. Also, during the compression stroke, fluid can flow through the orifice section provided between the rim 60 and the inner wall 62 of the rod and, therefore, fluid transfer between the oil chambers is rapid during such time. On the other hand, during expansion the oil located in the annular chamber 42 is directed into the chamber 46 solely through the passage 50 and the orifice section. In other words, the suspension device is constructed so that upon expansion, the piston member 22 causes the oil in the annular chamber 42 to be displaced through the passage 50 into the rod interior resulting in the free piston 44 moving downwardly as seen in FIGURE 2 to compress the gas in the accumulator chamber 48 to thereby store energy. It will be noted that during expansion, inasmuch as the oil flows through the clearance or orifice section, the transfer of oil from the chamber 42 to chamber 46 is restricted so that the speed of expansion is relatively slow. During contraction, however, the piston member 22 moves against the gas in the spring chamber 38 and at the same time the oil in chamber 46 flows under the influence of the piston member 44 from the rod interior back to the chamber 42. The latter action occurs as a result of the gas pressure in the accumulator chamber 48 working against the underside of the piston member 44, which in turn forces the oil through the orifice section and unseats the valve 54 as described above so that the contracting movement of the suspension device enjoys an increase in speed. Thus, the valve assembly 52 serves as a shock absorber unit for restricting flow in one direction and permitting increased flow of fluid when the device is moved in the opposite direction.

Various changes and modifications can be made in this construction without departing from the spirit of the invention. Such changes and modifications are contemplated by the inventor and he does not wish to be limited except by the scope of the appended claims.

I claim:

1. A hydropneumatic suspension device for supporting a vehicle chassis on a wheeled axle, said device comprising a cylinder member housing having a relatively movable primary piston member, said cylinder member being closed at one end thereof, said primary piston member having a hollow rod extending from the other end of said cylinder member, the inner end of said primary piston member formed with a head portion circumferentially and sealingly engaging the inner wall of said cylinder member, a secondary piston member slidably located in said rod portion and sealingly engaging the inner wall thereof, a first chamber filled with a compressible as and defined by the closed end of said cylinder member and one side of said head portion, a second chamber filled with an incompressible fluid and defined by the other side of said head portion, the inner wall of the cylinder member, and the outer wall of the rod portion, a third chamber located in said rod and defined by one side of the secondary piston and said other side of said head portion, a passage formed in said rod portion for permitting said incompressible fluid to move between said second and third chambers during expansion and contraction of the suspension device, a fourth chamber located in said rod on the other side of the secondary piston and filled with a compressible gas, a check valve assembly attached to said other side of said head portion, said valve assembly comprising means for restricting fluid flow between said second and third chambers when said suspension device is expanded, and a spring biased valve adapted to provide an increase rate of flow between said second and third chambers under the influence of the compressed gas in said fourth chamber when said suspension device is contracted.

2. A hydropneumatic suspension device for supporting a vehicle chassis on a wheeled axle, said device comprising a cylinder member housing having a relatively movable primary piston member, said primary piston member having a hollow rod extending from the other end of said cylinder member and terminating at its outer end with a mounting eye, the inner end of said primary piston member formed with a head portion circumferentially and sealingly engaging the inner wall of said cylinder member, a cap closing the head portion end of the cylinder and being formed with a mounting eye, a secondary piston member slidably located in said rod portion and sealingly engaging the inner wall thereof, a first chamber filled with a compressible gas and defined by said cap and one side of said head portion, a second chamber filled with an incompressible fluid and defined by the other side of said head portion, the inner wall of the cylinder member, and the outer wall of the rod portion, a third chamber located in said rod and defined by one side of the secondary piston and said other side of said head portion, a passage formed in said rod portion for permitting said incompressible fluid to move between said second third chambers during expansion and contraction of the suspension device, a fourth chamber located in said rod on the other side of the secondary piston and filled with a compressible gas, a check valve assembly attached to said other side of said head portion and located in said rod portion, said valve assembly means for restricting fluid flow between said second and third chambers when said suspension device is expanded, and a spring biased valve adapted to provide an increase rate of flow between said second and third chambers under the influence of the compressed gas in said fourth chamber when said suspension device is contracted.

3. A hydropneumatic suspension device for supporting a vehicle chassis on a wheeled axle, said device comprising a cylinder member housing having a relatively movable primary piston member, said cylinder member being closed at one end thereof, said primary piston member having a hollow rod extending from the other end of said cylinder member, the inner end of said primary piston member formed with a head portion circumferentially and sealingly engaging the inner wall of said cylinder member, a secondary piston member slidably located in said rod portion and sealingly engaging the inner wall thereof, a first chamber filled with a compressible gas and defined by the closed end of said cylinder member, a second chamber filled with an incompressible fluid and defined by the other side of said head portion, the inner wall of the cylinder member, and the outer wall of the rod portion, a third chamber located in said rod and defined by one side of the secondary piston and said other side of said head portion, a passage formed in said rod portion for permitting said incompressible fluid to move between said second and third chambers during expansion and contraction of the suspension device, a fourth chamber located in said rod on the other side of the secondary piston and filled with a compressible gas, a check valve assembly attached to said other side of said head portion and located in said rod portion, said valve assembly comprising a cup-shaped member having an annular rim adjacent to the inner wall of said rod portion and located to one side of said passage in said rod portion so as to restrict fluid flow between said second and third chambers when said suspension device is expanded, first and second apertures formed in said cup-shaped member, said first aperture being axially aligned with said passage in said rod portion, said second aperture being located radially inwardly from said rim, and a spring biased valve closing said second aperture and adapted to open to provide an increase rate of flow between said second and third chambers under the influence of the compressed gas in said fourth chamber when said suspension device is contracted.

4. A hydropneumatic suspension device for supporting a vehicle chassis on a wheeled axle, said device comprising a cylinder member housing having a relatively movable primary piston member, said primary piston member having a hollow rod terminating at its outer end with a mounting eye, the inner end of said piston member formed with a head portion circumferentially and sealingly engaging the inner wall of said cylinder member, a cap closing the head portion end of the cylinder and being formed with a mounting eye, a collar secured to the opposite end of said cylinder and sealingly engaging said rod portion, a secondary piston member slidably located in said rod portion and sealingly engaging the inner wall thereof, a first chamber filled with a compressible gas and defined by said cap and one side of said head portion, a second chamber filled with an incompressible fluid and defined by the other side of said head portion, the inner wall of the cylinder member, the outer wall of the rod portion, and said collar, a third chamber located in said rod and defined by one side of the secondary piston and said other side of said head portion, a passage formed in said rod portion for permitting said incompressible fluid to move between said second and third chambers during expansion and contraction of the suspension device, a fourth chamber located in said rod on the other side of the secondary piston and filled with a compressible gas, a check valve assembly attached to said other side of said head portion and located in said rod portion, said valve assembly comprising a cup-shaped member having an annular rim spaced from the inner wall of said rod portion for restricting fluid flow between said second and third chambers when said suspension device is expanded, first and second apertures formed in said cup-shaped member, said first aperture being axially aligned with said passage in said rod portion, and a spring biased valve closing said second aperture and adapted to open to provide an increase rate of flow between said second and third chambers under the influence of the compressed gas in said fourth chamber when said suspension device is contracted.

5. A hydropneumatic suspension device for supporting a vehicle chassis on a wheeled axle, said device comprising a cylinder member housing having a relatively movable primary piston member, means pivotally connecting one of said members to said vehicle chassis and the other of said members to said axle, said primary piston member having a hollow rod terminating at its outer end with a mounting eye, the inner end of said piston member formed with a head portion circumferentially and sealingly engaging the inner wall of said cylinder member, a cap closing the head portion end of the cylinder and being formed with a mounting eye, a collar secured to the opposite end of said cylinder and sealingly engaging said rod portion, a secondary piston member slidably located in said rod portion and sealingly engaging the inner wall thereof, a first chamber filled with a compressible gas and defined by said cap and one side of said head portion, a second chamber filled with an incompressible fluid and defined by the other side of said head portion, the inner wall of the cylinder member, the outer wall of the rod portion, and said collar, a third chamber located in said rod and defined by one side of the secondary piston and said other side of said head portion, a passage formed in said rod portion for permitting said incompressible fluid to move between said second and third chambers during expansion and contraction of the suspension device, a fourth chamber located in said rod on the other side of the secondary piston and filled with a compressible gas, a check valve assembly attached to said other side of said head portion and located in said rod portion, said valve assembly comprising a cup-shaped member having an annular rim adjacent to the inner wall of said rod portion and located to one side of said passage in said rod portion so as to restrict fluid flow between said second and third chambers when said suspension device is expanded, first and second apertures formed in said cup-shaped member, said first aperture being axially aligned with said passage in said rod portion, said second aperture being located radially inwardly from said rim, and a spring biased valve closing said second aperture and adapted to open to provide an increase rate of flow between said second and third chambers under the influence of the compressed gas in said fourth chamber when said suspension device is contracted.

No references cited.

ARTHUR L. LA POINT, *Primary Examiner.*

R. M. WOHLFARTH, *Assistant Examiner.*